(12) United States Patent
Fastenrath

(10) Patent No.: US 6,266,609 B1
(45) Date of Patent: Jul. 24, 2001

(54) PARKING SPACE DETECTION

(75) Inventor: Ulrich Fastenrath, Neuss (DE)

(73) Assignee: DDG Gesellschaft für Verkehrsdaten mbH, Düsseldorf (DE)

(*) Notice: Subject to any disclaimer, the term of this patent is extended or adjusted under 35 U.S.C. 154(b) by 0 days.

(21) Appl. No.: 09/453,342

(22) Filed: Dec. 1, 1999

(30) Foreign Application Priority Data

Dec. 2, 1998 (DE) .............................................. 198 56 478

(51) Int. Cl.[7] .............................. G01C 21/00; B60Q 1/48
(52) U.S. Cl. ......................... 701/200; 701/207; 701/214; 701/23; 701/24; 340/932.2; 235/384; 414/227; 705/13; 705/418
(58) Field of Search ..................................... 701/200, 207, 701/214, 23, 24; 340/932.2; 235/384; 414/227; 705/13, 418

(56) References Cited

U.S. PATENT DOCUMENTS

5,091,727 * 2/1992 Nahmood .......................... 340/932.2
5,504,314 * 4/1996 Farmont .............................. 235/384

* cited by examiner

*Primary Examiner*—William A. Cuchlinski, Jr.
*Assistant Examiner*—Yonel Beaulieu
(74) *Attorney, Agent, or Firm*—Cohen, Pontani, Lieberman & Pavane

(57) ABSTRACT

A method for detecting information on occupied parking space in a traffic network, in particular a town, uses a parking space detection control center. Parking space information relating to a stationary phase of a vehicle and the vehicle location is transmitted to the control center from a navigation system at the vehicle. Information relating to empty parking space is generated by the control center and information relating to empty parking space is transmitted from the control center to a navigation system at the vehicle end.

27 Claims, 2 Drawing Sheets

PARKING SPACE DETECTION

BACKGROUND OF THE INVENTION

1. Field of the Invention

The invention relates to a method for automatically detecting information relating to empty parking spaces in a traffic network, such as in a town, as well as to a device for performing the method.

2. Description of the Related Art

With regard to detecting empty parking spaces, it is known for large parking garages and their parking control systems in large towns to detect the number of empty or available bays in parking garages with the aid of sensors at the entrance and exit of the parking garage. These systems determine the amount of cars in the garage and compare it to the total number of bays. The availability of parking spaces is indicated via displays on main roads. However, this known method is limited to parking garages or spaces with a limited number of entrances that can be monitored.

SUMMARY OF THE INVENTION

The object of the present invention is for the empty parking space in a traffic network, such as in a town, to be detected in a way which is as simple as possible, cost-effective and optimized efficiently.

The object is achieved by a method for automatically acquiring information at a control center from a navigation system of a first vehicle in a traffic network related to occupied parking spaces in the traffic network, comprising the steps of (a) transmitting standstill information related to a stationary phase of the first vehicle and a location of the first vehicle from the navigation system of the first vehicle to the control center; (b) generating empty parking space information at the control center for parking spaces in the traffic network in response to the standstill information transmitted in said step (a); and (c) transmitting the empty parking space information from the control center to the navigation system of a second vehicle.

The method according to the invention effectively monitors the occupation proportion of parking spaces without the installation of loop detectors in every parking bay of a traffic network of a town. The method also allows differentiation to be made when outputting the occupation proportion with regard to different zones of the town. The method according to the present invention uses navigation systems which are installed in vehicles which will also be used in future in vehicles for the purpose of navigation and for detecting traffic data by vehicles moving along with the traffic flow. The method uses these detectors so that the availability of parking spaces can be detected without expensive modifications to the parking space or the vehicle.

In principle, the method determines that a vehicle is parked when the vehicle is stationary and fulfills other prescribed conditions such as having the engine turned off. The stationary vehicles in a town or a part of a town can be compared in zones with known data (for example from a historical data bank of information, detected according to the invention, on vehicles), so that the proportion of parking spaces occupied can be established. Furthermore, when the position of a vehicle can be determined very accurately and the positions of parking possibilities are also very accurately known, it is also possible to output advice on individual parking possibilities to vehicles requesting the same.

Different types of information may be generated with the aid of the detected information on empty parking space and transmitted to vehicles. For example, a percentage of empty parking space may be outputted as a proportion of the total parking spaces. The proportion may also refer to the total parking space of a differentiated zone. It is possible, furthermore, to output information such as which zones of a town have a sufficiently high percentage of empty parking spaces, i.e., areas where parking is readily available. It is also possible to output detailed position data regarding individual empty parking bays when such data are known sufficiently accurately. The vehicle navigation system may then use this information to determine a path to the parking space and output navigation advice, which has been generated in the navigation system or a control center, for getting to the specific parking space.

With regard to a device for carrying out the method, a control center comprises a parking space data processing device for generating information which is to be output at navigation systems and can be generated from information relating to existing parking space and stored information relating to parking space no longer empty and reported by vehicles. A short message transceiver for mobile radio point-to-point messages is used to receive queries from navigation systems with regard to empty parking space, and to transmit answers to navigation systems with regard to empty parking spaces.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
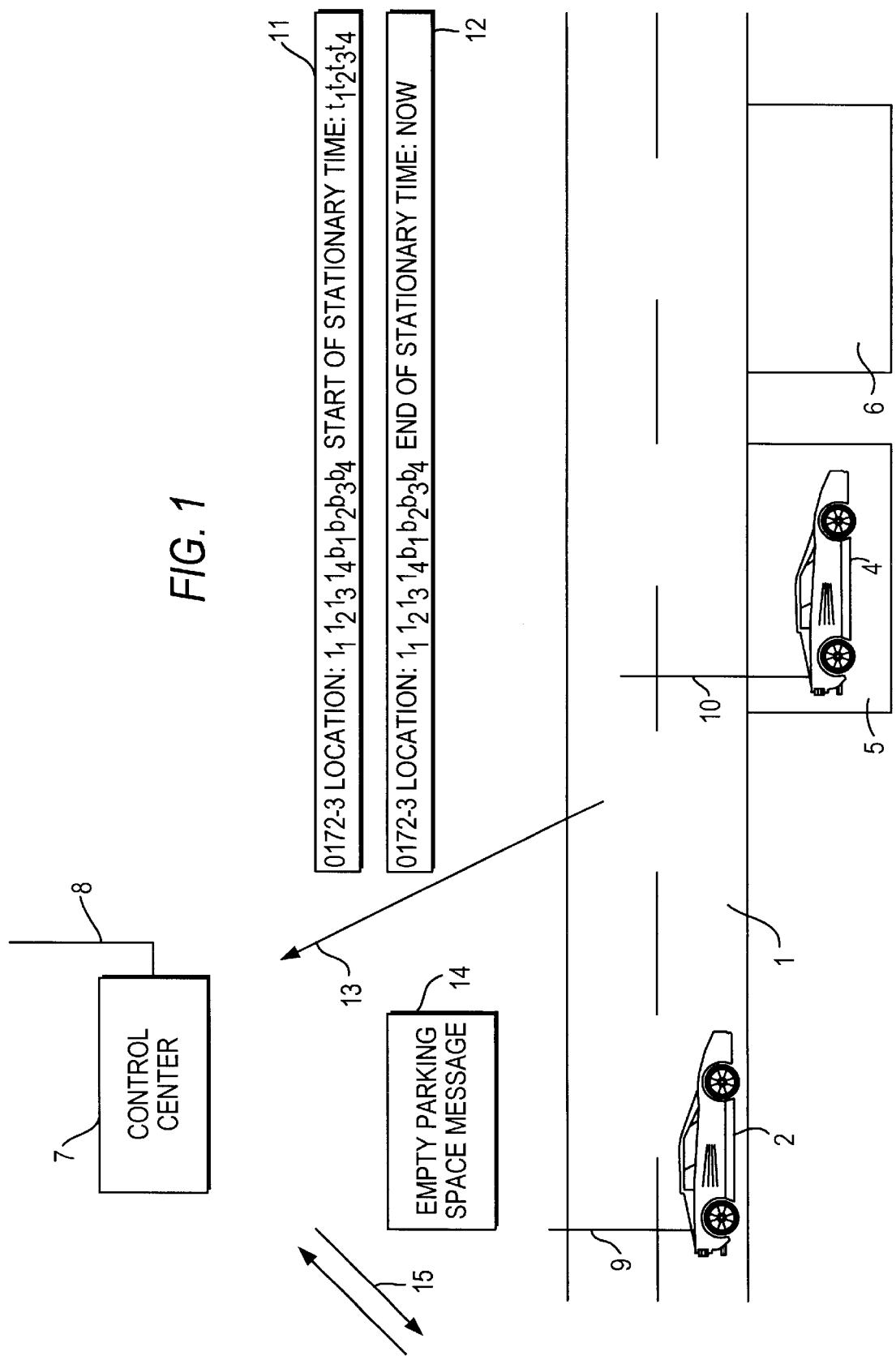
FIG. 1 is a schematic diagram showing a section of a traffic network with an occupied and a empty parking space, and a control center according to an embodiment of the present invention for detecting the occupied parking space.

FIG. 1 shows a street 1 in a traffic network such, for example, as a town center, a first vehicle 2 driving on the street 1, a parking space 5 occupied by a second vehicle 4, a empty parking space 6 (i.e., a empty parking bay), a parking space detection control center 7. A transceiver 8 is arranged on the parking space detection control center 7 for receiving information 11, 12 on occupied parking spaces as a mobile radio short message 13 (SMS-MO) from transceivers 9, 10 which are respectively mounted on the first and second vehicles 2, 4. The control center 7 itself emits information 14 on empty parking space as a mobile radio short message 15 (SMS-MT) to the first and second vehicles 2, 4.

Figure 2:
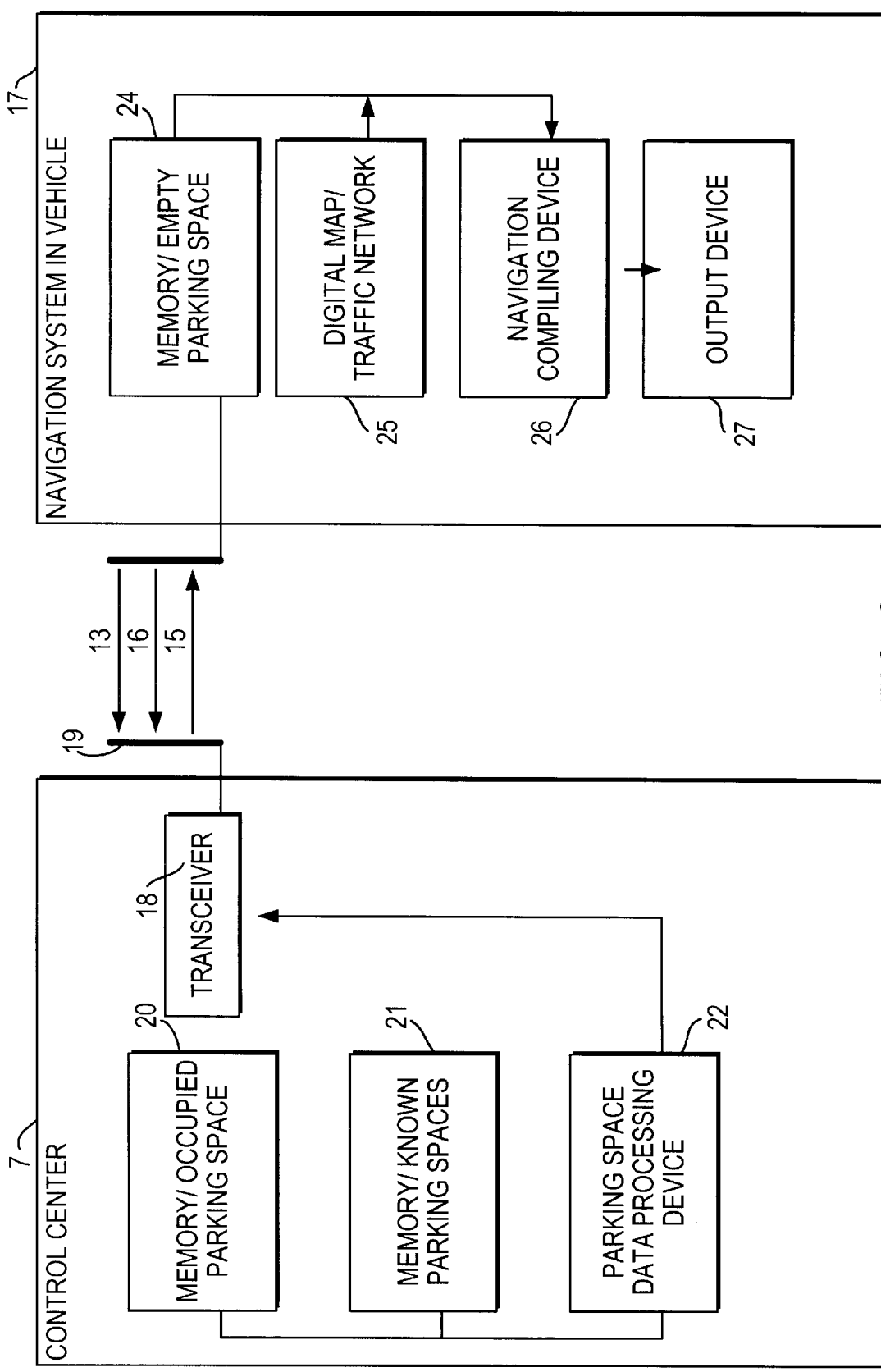
FIG. 2 is a block diagram of a parking space detection control center and a parking space detection navigation system arranged at a vehicle according to an embodiment of the present invention.

The first and second vehicles 2, 4 each have a navigation system 17 shown in FIG. 2. The navigation system 17 includes devices which can automatically generate vehicular traffic data, that is to say data which specify the positions of vehicles in the traffic and can be used for the purpose of traffic information. According the present invention, the navigation systems 17 in the vehicles are now also used for detecting empty parking spaces. These navigation systems 17 are not installed in every vehicle. Therefore, the information transmitted by the navigation systems 17 represents only a portion of the total vehicles. Accordingly, the number of vehicles that have the navigation system 17 is estimated and then the number of those vehicles that are parked is determined. Accordingly, it is possible to detect with regard to zones in a town, what proportion of the vehicles that have navigation systems 17 are parked. The proportion of vehicles with navigation systems 17 that are parked is taken as the proportion of all vehicles that are parked. In this way, the amount of empty parking spaces can be determined.

To determine when a vehicle such as the second vehicle 4 is packed in a parking space, a begin stand still message II is transmitted from the second vehicle 4 to the parking space detection control center 7, at least under prescribable conditions. For example, the begin standstill message 11 may be transmitted when the second vehicle 4 which has an automatic transmission is switched into the park position. In an alternative example, the begin standstill message 11 may be transmitted when the vehicle is stationary for longer than a prescribed time. The second vehicle 4 may also transmit other messages 13 to the control center 7 at cyclic intervals when it is stationary. In this embodiment, the control center 7 may perform checks as to the presence of conditions under which the vehicle is defined as parked (for example, the control center 7 may check that the vehicle is not in front of a traffic light).

In particular, at the start of a stationary phase, that is to say when the vehicle is parked (and other conditions are possible fulfilled), the vehicle may transmit a begin standstill message 11 to the control center 7. Furthermore, the vehicle may also transmit an end standstill message 12 at the end of a stationary phase to the control center 7. The message on the start or the continuing existence of a stationary phase of a vehicle (begin standstill message 11) may, for example, include the location of the vehicle. The location information enables the control center 7 to perform a further check with regard to a specific parking bay as to whether the latter is occupied. It is thereby possible to compare a plurality of begin standstill messages 11 present in relation to a specific position 5, and thereby to delimit with higher probability the presence of a parking situation by contrast with other stationary phases, such as in front of traffic lights. Furthermore, the begin standstill message 11 and end standstill message 12 relating to stationary phases of a vehicle may also include data identifying the vehicle. The control center 7 may then verify that a specific vehicle 4 is stationary over a prescribed time, and therefore probably parked. An identifying parameter may, for example, comprise a telephone number (i.e., 0172-3) that is transmitted with the short message 13 from the navigation system in the vehicle 4. The identity is expediently further processed in an anonymous manner.

The control center 7 uses the data from all the vehicles relating to occupied parking space to determine empty parking space information.

The control center 7 may transmit empty parking space messages 14 to vehicles such as vehicle 2. The transmission of the empty parking space message 14 may be performed as a cell broadcast message 15 to all vehicles in a specific area (i.e., in specific cells or cell groups). The empty parking space message 14 may also be transmitted to specific vehicles as a point-to-point short message, thereby permitting this service to be billed. However, billing is also rendered possible when a cell broadcast transmission is performed and keys for decoding such information are present only in specific navigation systems of vehicles 2.

The transmission 15 of the empty parking space message 14 may, for example, be performed cyclically. Alternatively, the transmission 15 may also be output in response to a query from a navigation system of a vehicle 2 in the case of a control center 7 (for example with the aid of a point-to-point short message 16 from the vehicle 2 to the control center 7).

The degree of occupancy of a zone with parked vehicles (that is to say proportions of all parking bays which are occupied ones) can be calculated approximately as follows, where:

$\alpha$ is the percentage of cars with navigation systems;
N is the number of parking bays in an area;
$I=[t_0,t_1]$ is the observing interval;
$T=t_1-t_0$ is the observing time;
n(t) is the number of parking operations in the area which start before time t;
$p_0^i, p_1^i$ is the start and end of the i-th parking operation in the area;
$d_i = p_1^i - p_0^i$ is the duration of the i-th parking operation;
$d_i^1$ is the proportion of the duration of the i-th parking operation within the observing interval
$d_i(t) = (d_i^1)$ is the mean value over all parking operations in the area which start before time t; and
B(t) is the extent of occupancy at time t.

Evidently, it holds that $d_i^1 = \max(0, \min(t_1, p_1^i) - \max(t_0, P_0^1))$ and an approximation to the degree of occupancy is yielded as $$B\left(\frac{1}{2}(t_0 + t_1)\right) \approx \frac{\ln(t_1) d_1(t_1)}{\alpha \cdot N \cdot T}$$

Moreover, historical information in a data bank in the control center 7, or data from the traffic environment (such as large-scale events, weather, weekday) may be used for forecasting empty parking space information at a future point in time.

The forecasting of the empty parking space at a future point in time is helpful for vehicles which are still located in an approach phase to a zone (i.e., a town) with a parking space occupancy quota which is unknown in relation to the future time of arrival.

In addition to information on locations with associated proportions of parking space occupancy, further information may be transmitted by a control center 7 to navigation systems in a vehicle 2. More specifically, the control center may provide information to guide the vehicle into zones or sections of a town having a high proportion of empty parking spaces. The navigation instructions may be produced in the control center 7 and be transmitted with a message 14 to a navigation system (in the vehicle 2) for output there or, in the case of transmission only of the position of empty parking space in a message 14, be compiled on the spot with the aid of a navigation system in the vehicle 2, and output.

In the case of a lengthy approach of a vehicle 2 to the empty parking space 6, the control center may repeatedly transmit updates with regard to information relating to empty parking spaces to the navigation system of the vehicle 2.

It is also possible to transmit prices of an empty parking space with the aid of the empty parking space message 14.

Before embarking on a journey such, for example, as into a town center on Saturday morning, a driver may inquire in a control center 7 with regard to empty parking spaces at the forecast time of arrival in the town center. Empty parking space message 14 may then be transmitted back to the vehicle 2 by the control center 7. If appropriate, a parking space may be reserved, in particular for closed-off parking bays.

It is also possible for a user of a navigation system in a vehicle 2 when making an inquiry 16 to specify preferences with regard to preferred zones and/or prices of empty parking spaces.

FIG. 2 shows some components of a control center 7 and of the navigation system 17 for the first and second vehicles 2, 4 and messages transmitted between them.

The transceiver 18 is shown as arranged in the control center 7 for transmitting and receiving information, in particular short messages (SMS-MO and SMS-MT) with an indicated transceiving antenna 19. In the control center 7, information 13 relating to occupied parking space and entering the transceiving device 18 is stored in a memory 20 for information on occupied parking spaces. Furthermore, the control center 7 may comprise a memory 21 with data relating to known parking spaces, in particular with assigned positions. In a parking space data processing device 22, the data stored in the memory 20 and relating to occupied parking space and the data stored in the memory 21 and relating to known parking space are compared, and information 14 relating to empty parking space is compiled and 23 transmitted to the transceiving device 18 for transmission 15 to a navigation system 17.

Empty parking space messages 14 transmitted from the control center 7 and relating to empty parking space are stored in a memory 24 in the navigation system 17 associated with their position (i.e., their geographical longitude $l_5$, $l_6, l_7, l_8$ and latitude $b_5, b_6, b_7, b_8$, with 4 bytes here in each case) and/or navigation advice. In the present case, the navigation system 17 also includes a digital map 25 of the traffic network. From the digital map 25 of the traffic network and transmitted information in the memory 24 relating to empty parking space, a navigation unit 26 determines navigation proposals relating to empty parking space such, for example, as to the parking bay 6 in FIG. 1 for the inquiring vehicle 2. The navigation proposal is then output optically and/or acoustically via an output device 27. The output may always be performed in advance for the next intersection or turn-off together with specification of the turn-off direction to be adopted.

The invention is not limited by the embodiments described above which are presented as examples only but can be modified in various ways within the scope of protection defined by the appended patent claims.

I claim:

1. A method for automatically acquiring information at a control center from a navigation system of a first vehicle in a traffic network related to occupied parking spaces in the traffic network, comprising the steps of:
   (a) transmitting standstill information related to a stationary phase of the first vehicle and a location of the first vehicle from the navigation system of the first vehicle to the control center;
   (b) generating empty parking space information at the control center for parking spaces in the traffic network in response to the standstill information transmitted in said step (a); and
   (c) transmitting the empty parking space information from the control center to the navigation system of a second vehicle.

2. The method of claim 1, wherein said step (a) comprises transmitting the standstill information to the control center at the start and at the end of the stationary phase of the first vehicle.

3. The method of claim 2, wherein said step (a) further comprises transmitting the location of the vehicle at the start and at the end of the stationary phase of the first vehicle.

4. The method of claim 1, wherein said step (a) comprises transmitting at least one transmission relating to the stationary phase of the first vehicle to the control center during the stationary phase of the first vehicle.

5. The method of claim 1, wherein step (a) further comprises transmitting an identity of the first vehicle with the standstill information relating to the stationary phase of the first vehicle.

6. The method of claim 5, wherein the step of transmitting identity information comprises transmitting a telephone number of the navigation system.

7. The method of claim 5 wherein said step (b) comprises comparing the identity information of the first vehicle with information previously received from the first vehicle to determine with a higher significance whether the first vehicle is occupying a parking space.

8. The method of claim 1, wherein said step (b) further comprises regarding the vehicle as parked when the vehicle is located in a stationary phase at the same location for at least a prescribed time.

9. The method of claim 1, wherein said standstill information comprises information regarding a state of the first vehicle engine and said step (b) further comprises regarding the first vehicle as parked when the engine of the first vehicle is switched off.

10. The method of claim 1, further comprising the step of detecting when the first vehicle is at a stationary position by comparing sequentially detected positions of the first vehicle before said step (a).

11. The method of claim 1, further comprising the step of determining a standstill period when the engine of the first vehicle is started.

12. The method of claim 1, further comprising the step of determining a stationary phase when a gear change mechanism of the first vehicle is moved to a first position associated with the stationary phase.

13. The method of claim 12, further comprising the step of determining an end of the stationary phase when the gear change mechanism of the first vehicle is located in a second position associated with a non-stationary phase.

14. The method of claim 1, wherein said step (b) comprises determining empty parking bays by determining the locations of all vehicles in a traffic network that are defined as parked by the control center with a database in the control center listing all known parking bays.

15. The method of claim 1, wherein said step (b) comprises determining empty parking spaces or proportions of empty parking space in a traffic network by zones.

16. The method of claim 1, further comprising the step of forecasting empty parking space information for a future point in time based on historical data for that future point in time.

17. The method of claim 1, wherein said step (b) comprises determining the degree of occupancy of the parking spaces in accordance with the relationship $$B\left(\frac{1}{2}(t_0 \times t_1)\right) \approx \frac{\ln(t_1) d_1(t_1)}{\alpha \, N \cdot T},$$

wherein

α is the proportion of vehicles with navigation systems;

N is the number of parking bays in the traffic network;

$I=[t_0,t_1]$ is the observing interval;

$T=t_1-t_0$ is the observing time;

n(t) is the number of parking operations in the area which start before time t; and B(t) extent of occupancy at time t.

18. The method of claim 1, further comprising the step of compiling parking space forecasts on the basis of the current parking space information.

19. The method of claim 1, further comprising the step of determining parking space forecasts on the basis of historical parking space information in the control center.

20. The method of claim 18, wherein the day of the week or the time of day of the future point in time is used to determine the parking space forecast.

21. The method of claim 1, wherein said step (c) comprises transmitting information on the location of zones with a plurality of empty parking bays or on the location of individual empty parking bays by the control center to the navigation system of the second vehicle.

22. The method of claim 1, wherein said steps (a) and (c) are performed via a wireless communication system.

23. The method of claim 22, wherein said steps (a) and (c) are performed using mobile radio short messages.

24. The method of claim 1, wherein said step (c) further comprises transmitting price information for empty parking spaces.

25. The method of claim 1, further comprising the step of producing a navigation route from a current location of the navigation system in the second vehicle to the empty parking space and outputting the navigation route by the navigation system.

26. A parking space detection control center for acquiring information from navigation systems of vehicles in a traffic network related to occupied parking spaces, comprising a transceiver for receiving information transmitted from the navigation systems in the traffic network related to occupied traffic spaces;

a memory for storing the information related to occupied traffic spaces received by said transceiver; and a parking space data processing device for generating information relating to empty parking spaces in response to the information related to occupied parking spaces and the memory, said transceiver transmitting the information relating to the empty parking spaces to the navigation systems in the traffic network.

27. The parking space detection control center of claim 26, wherein said transceiver comprises a mobile radio device comprising means for transmitting and receiving short messages.

* * * * *